US010072851B1

(12) United States Patent
Juhasz et al.

(10) Patent No.: US 10,072,851 B1
(45) Date of Patent: Sep. 11, 2018

(54) BUILDING-INTEGRATED SOLAR ENERGY SYSTEM

(71) Applicant: TENKIV, INC., Sacramento, CA (US)

(72) Inventors: Zachary Juhasz, Sacramento, CA (US);
William Juhasz, Sacramento, CA (US)

(73) Assignee: Tenkiv, Inc., Sacramento, CA (US)

( * ) Notice: Subject to any disclaimer, the term of this patent is extended or adjusted under 35 U.S.C. 154(b) by 0 days.

(21) Appl. No.: 13/954,809

(22) Filed: Jul. 30, 2013

Related U.S. Application Data

(60) Provisional application No. 61/711,103, filed on Oct. 8, 2012, provisional application No. 61/701,988, filed
(Continued)

(51) Int. Cl.
*F24J 2/34* (2006.01)
*F24D 11/00* (2006.01)
(Continued)

(52) U.S. Cl.
CPC ........ *F24D 11/003* (2013.01); *F24D 17/0015* (2013.01); *F24J 2/24* (2013.01);
(Continued)

(58) Field of Classification Search
CPC ..... F24J 2/1047; F24J 2/38; F24J 2/40; F03G 6/06
(Continued)

(56) References Cited

U.S. PATENT DOCUMENTS 4,169,554 A * 10/1979 Camp ..................... F24F 3/001
126/610
4,289,113 A 9/1981 Whittemore
(Continued)

FOREIGN PATENT DOCUMENTS

DE 19710642 A1 * 9/1998 .............. F24J 2/045

OTHER PUBLICATIONS

Farid Arya et al., Current Developments in Flat-Plate Vacuum Solar Thermal Collectors, World Academy of Science, Engineering and Technology International Journal of Energy and Power Engineering, vol. 10, No. 6, 2016, pp. 715-719.
(Continued)

*Primary Examiner* — Gregory Huson
*Assistant Examiner* — Nikhil Mashruwala
(74) *Attorney, Agent, or Firm* — Dorsey & Whitney LLP

(57) ABSTRACT

A building-integrated solar energy system that concurrently provides space heating, space cooling, hot water, and electricity to commercial and residential buildings. The solar energy system comprises an evacuated closed-loop conduit network circulating a working fluid through a solar thermal collector and at least one heat usage device, wherein the effective entirety of the surfaces of the closed-loop conduit network are in contact with the working fluid such that phase change occurs whenever heat energy is added by the solar thermal collector or removed by a heat usage device. The solar energy system further comprises an impermeable outer housing enveloping the closed-loop conduit network and forming an evacuated space located between and defined by the outer surface of the closed-loop conduit network and the inner surface of the impermeable housing such that the working fluid is adiabatically isolated. As a result, the full surface contact and low-pressure isolation of the working fluid dramatically reduces temperature differentials and energy losses, allowing for highly efficient and cost-effective heat collection and distribution.

11 Claims, 1 Drawing Sheet

Related U.S. Application Data on Sep. 17, 2012, provisional application No. 61/704,999, filed on Sep. 24, 2012, provisional application No. 61/703,113, filed on Sep. 19, 2012.

(51) Int. Cl.
*F24J 2/24* (2006.01)
*F24D 17/00* (2006.01)
*F24J 2/46* (2006.01)
*F03G 6/06* (2006.01)
*F24J 2/10* (2006.01)

(52) U.S. Cl.
CPC ............... *F24J 2/34* (2013.01); *F24J 2/4649* (2013.01); *F03G 6/06* (2013.01); *F24J 2/10* (2013.01)

(58) Field of Classification Search
USPC .................... 126/714, 618, 446; 165/104.25
See application file for complete search history.

(56) References Cited

U.S. PATENT DOCUMENTS

| | | | |
|---|---|---|---|
| 4,470,450 A | 9/1984 | Bizzell et al. | |
| 7,810,491 B2* | 10/2010 | Benvenuti ................. | F24J 2/05 126/653 |
| 8,182,688 B2* | 5/2012 | Simmons ............... | C12M 21/04 210/120 |
| 2011/0253127 A1* | 10/2011 | Lowe ...................... | F24J 2/055 126/641 |
| 2015/0362219 A1* | 12/2015 | Wehner ................. | F24J 2/4625 126/714 |

OTHER PUBLICATIONS

Genersys Plc, Genersys 1450 Flat Plate Vacuum Solar Collector, The World's only panel combining the advantages of both flat plate aesthetics and vacuum technology, 2008, 2 pages.
Genersys Plc, Genersys 1850 Super Hot Flat Plate Vacuum Solar Collector, The World's only panel combining the advantages of both flat plate aesthetics and vacuum technology, intended for Industrial and Commercial use, 2008, 2 pages.

* cited by examiner

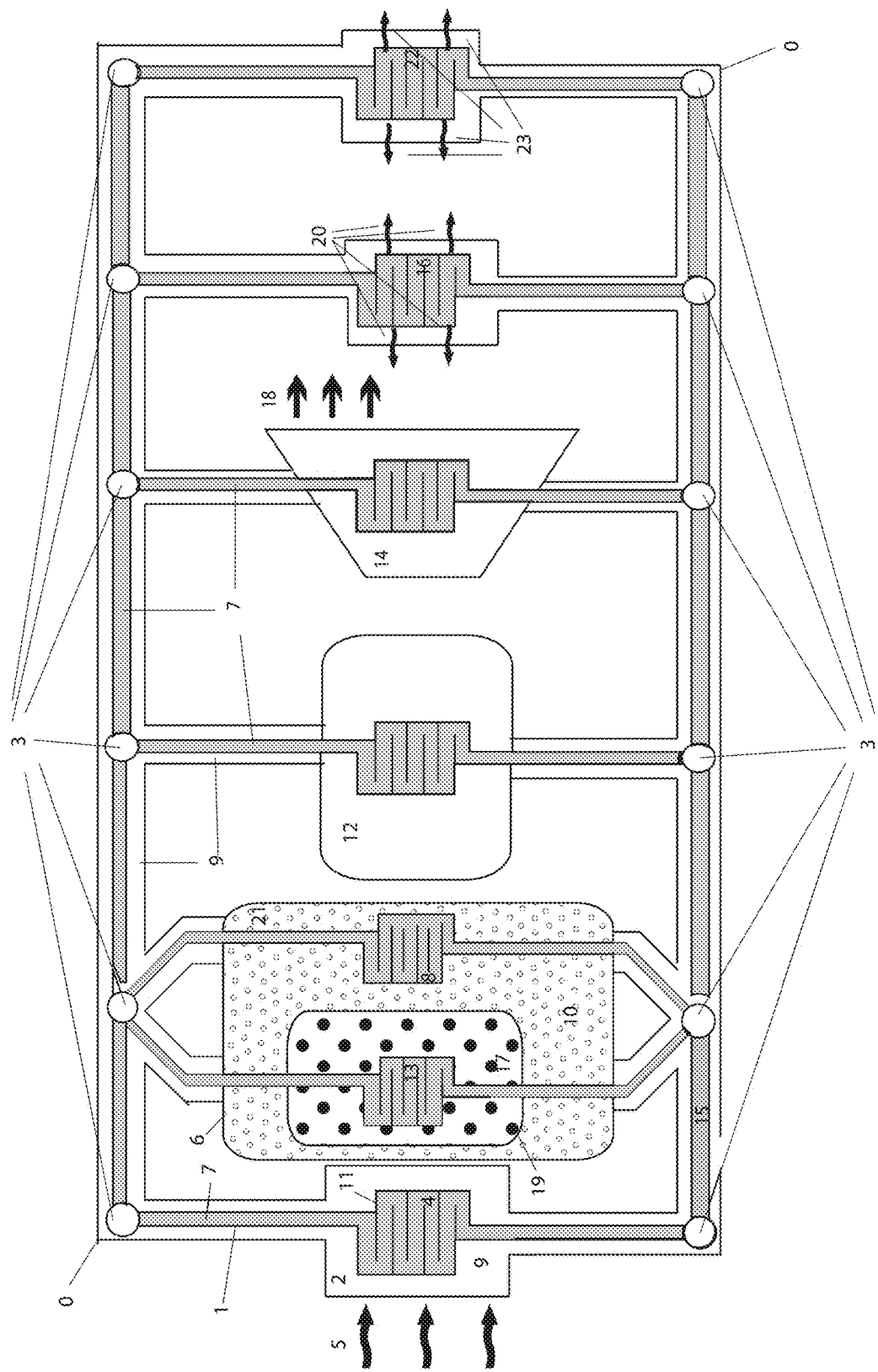

BUILDING-INTEGRATED SOLAR ENERGY SYSTEM

REFERENCE TO RELATED APPLICATIONS

The present application claims priority to the following provisional patent applications, each of which are incorporated by reference herein:
Appt. Ser. No. 61/711,103 filed on Oct. 8, 2012
Appt. Ser. No. 61/701,988 filed on Sep. 17, 2012
Appt. Ser. No. 61/704,999 filed on Sep. 24, 2012
Appt. Ser. No. 61/703,113 filed on Sep. 19, 2012

FIELD OF THE INVENTION

The present invention relates in general to solar energy systems in which solar thermal energy is directly absorbed by a working fluid to simultaneously and reliably provide space heating, space cooling, water heating, and electricity generation to a building.

BACKGROUND

Solar thermal energy is a technology for harnessing solar energy in the form of heat. The thermal energy of solar radiation is absorbed by an absorber body in a solar thermal collector in which a working fluid is heated by the absorber body and circulated between the solar thermal collector and the end use. Traditional solar thermal systems are specifically used in either power plant electricity generation, hot water heating, or space heating and cooling. However, due to the current designs of available solar thermal technology, a solar thermal system that concurrently provides all of the above services to a residential or commercial building (essentially a "net-zero building") does not exist.

The primary limitation with existing solar thermal systems is a conflict between two properties. The first property being that solar thermal systems are most efficient when its solar collectors operate at ambient temperature, that is, the hotter a solar collector gets above ambient, the more heat energy it loses to the environment via conduction, convection, and radiation. This directly opposes with the second property being that the working fluid inside the solar thermal collector must be at a greater temperature than that of the end use for heat to move in the desired direction. As a result, a contradiction occurs being that having a high solar collector temperature is required for collecting more usable heat energy, yet a higher solar collector temperature also means losing more heat energy. Therefore, existing solar thermal systems are extremely inefficient at high temperature differentials, meaning that they are unable to provide a building with enough energy to completely satisfy its needs.

SUMMARY

In a preferred embodiment, the present invention provides for a solar energy system for collecting and distributing heat energy from the sun into a building for usage comprising a closed-loop conduit network whose entire inner surface is in contact with a working fluid such that any substantial temperature differentials of the working fluid become negligible across the system, wherein the closed-loop conduit network is evacuated to a pressure such that the working fluid experiences phase change whenever heat energy is added or removed, an impermeable housing enveloping the closed-loop conduit network and forming a high vacuum located between and defined by the outer surface of the closed-loop conduit network and the inner surface of the impermeable housing such that the working fluid is adiabatically isolated inside the closed-loop conduit network, a solar thermal collector whose enclosure seals a portion of the evacuated space inside such that the enclosure forms a portion of the impermeable housing, the solar thermal collector further containing a solar absorber thermally coupled to a heat transfer interface, a heat exchanger connected in parallel to the heat transfer interface and located inside a thermal storage tank containing a thermal mass for storing heat energy, an absorption chiller connected in parallel to the heat exchanger and coupled with a fan coil unit to provide space cooling, an air heat exchanger for providing space heating and connected in parallel to the absorption chiller, and a heat engine coupled with a generator to provide electricity and connected in parallel to the air heat exchanger, whereby the working fluid received by the heat transfer interface obtains heat energy from the solar absorber, evaporates, and flows through either: the heat exchanger, the absorption chiller, the air heat exchanger, or the heat engine; at which the working fluid releases heat energy, condenses, and collects at a liquid reservoir, wherein a pump connected in series to the liquid reservoir propels the condensed working fluid towards the solar thermal collector and into the heat transfer interface to begin a new cycle.

The present invention addresses the inefficiency problem in existing solar thermal systems by possessing several features to minimize temperature differentials. First, the full surface contact with the working fluid in conjunction with phase change brings temperature differentials across the system down to almost nothing, increasing efficiency. This allows the system to accumulate more solar heat energy while staying at a reduced overall temperature. In addition, phase change reduces energy consumption because the energy required to change a liquid to a gas (or vice versa) is many times higher than the energy required to heat a liquid or gas a few degrees. In addition the energy required to move the vapor comes from the solar energy source, and so requires no pump. Finally, the impermeable outer housing provides a vacuum insulation to greatly reduce heat energy lost from conduction and convection. This allows the solar thermal system to operate more efficiently at higher temperatures above ambient. The impermeable outer housing also makes the system extremely cost effective because it prevents exposure of the closed-loop conduit network to the outside environment, thereby eliminating the need for pressure resistant material in its members and the risk of corrosion. The resulting high efficiency and cost-effectiveness of the solar energy system allows it to provide a building with space heating, space cooling, hot water, electricity, and energy storage simultaneously.

BRIEF DESCRIPTION OF THE DRAWINGS

The present invention and its advantages will be better understood by referring to the following detailed description and the attached drawing in which:
FIG. 1 shows a schematic view of the solar energy system described herein.

DETAILED DESCRIPTION OF THE DRAWINGS

In the following description, the use of "a", "an", or "the" can refer to the plural. All examples given are for clarification only, and are not intended to limit the scope of the invention.

Referring to FIG. 1, according to a preferred embodiment, a solar energy system includes a closed-loop conduit network 1 that is evacuated to a predetermined pressure and filled with a working fluid 7 such that the effective entirety of the surfaces of the closed-loop conduit network 1 are in contact with the working fluid 7. The low-pressure isolation of the working fluid 7 causes evaporation whenever heat energy is added and condensation whenever heat energy is removed. As a result, temperature differentials of the working fluid 7 become essentially nothing, allowing for highly efficient heat distribution. An outer impermeable housing 0 surrounds the closed-loop conduit network 1, forming an evacuated space 9 located between and defined by the inner surface of the outer impermeable housing 0 and the outer surface of the closed-loop conduit network 1. The inner surface of the outer impermeable housing 0 comprises layers of radiation shielding. As a result, the working fluid 7 is adiabatically isolated and the closed-loop conduit network 1 members are not exposed to the outside environment, thereby eliminating the need for pressure (compressive) resistant material and the risk of corrosion.

The closed-loop conduit network 1 connects the following heat transfer devices in parallel: a heat transfer interface 4 coupled with a solar absorber 11 located inside a solar thermal collector 2, a first heat exchanger 8 located inside an outer compartment 21 of a thermal storage tank 6, a second heat exchanger 13 located inside an inner compartment 19 of the thermal storage tank 6, a heat engine 14, an air heat exchanger 16, an absorption chiller 12, and a hot water heat exchanger 22. The outer compartment 21 contains a first thermal mass 10. The inner compartment 19 contains a second thermal mass 17. The enclosure forming the solar thermal collector 2 connects to the outer impermeable housing 0 such that the space inside is a part of the evacuated space 9. The heat engine 14 is coupled with a generator to generate electricity. The absorption chiller 12 may be associated with a fan-coil unit (not shown) to provide cool air to a space. The hot water heat exchanger 22 is configured to heat potable water supplied by building's water mains. A plurality of control points 3 are configured to control flow direction of the working fluid 7. A liquid reservoir 15 is configured to collect and store excess working fluid 7.

The closed-loop conduit network 1 circulates the working fluid 7 in an environment with an absolute pressure, of materials other than the working fluid, that is lower than the vapor pressure of the working fluid 7 at 0 degrees Celsius. The absolute pressure is preferably 1 to 1000 milliTorr. The working fluid 7 can be any fluid, preferably propylene glycol due to its low freezing point, appropriate vapor pressure and low toxicity. Both the first thermal mass 10 and second thermal mass 17 can be water, but second thermal mass 17 is preferably a compound that changes from a solid to a liquid at a predetermined storage temperature. The second thermal mass 17 is stored inside the inner compartment 19 at a higher temperature than that of the first thermal mass 10, preferably 150 degrees Celsius.

The control points 3 can have the form of either valves or pumps. The solar thermal collector 2 can be any device in which solar energy is absorbed by a working fluid, preferably a flat plate solar thermal collector. The solar absorber 11 is preferably a low emissivity selective coating. The heat engine 14 can also be a turbine-generator to directly generate electricity using heat energy. The absorption chiller 14 can also be configured to provide space heating. The thermal storage tank 6 rests at a lower location than all other heat transfer devices for gravity-induced flow purposes:

The heat transfer interface 4 is preferably configured such that an inlet at which the liquid state of the working fluid 7 enters is at a lower elevation than an outlet at which the vapor state of the working fluid 7 exits to inhibit reverse flow. The first heat exchanger 8 is preferably configured such that an inlet at which the vapor state of the working fluid 7 enters is at a higher elevation than an outlet at which the liquid state of the working fluid 7 exits to inhibit reverse flow. The second heat exchanger 13 is preferably configured such that an inlet at which the vapor state of the working fluid 7 enters is at a higher elevation than an outlet at which the liquid state of the working fluid 7 exits to inhibit reverse flow. The air heat exchanger 16 is preferably configured such that an inlet at which the vapor state of the working fluid 7 enters is at a higher elevation than an outlet at which the liquid state of the working fluid 7 exits to inhibit reverse flow. The hot water heat exchanger 22 is preferably configured such that an inlet at which the vapor state of the working fluid 7 enters is at a higher elevation than an outlet at which the liquid state of the working fluid 7 exits to inhibit reverse flow.

Solar thermal collector 2 acts as an evaporator by absorbing solar radiation 5 into solar absorber 11 and transferring heat energy into working fluid 7. The working fluid 7 changes into vapor form and is transported to at least one of the following heat usage devices: the first heat exchanger 8, second heat exchanger 13, the air heat exchanger 16, the hot water heat exchanger 22, the absorption chiller 12, the heat engine 14, and any combination thereof depending on the end use energy needs. The heat usage devices act as condensers, wherein upon contact with the working fluid 7, the working fluid 7 in vapor form condenses into a liquid state by either releasing heat energy to the first thermal mass 10 via the first heat exchanger 8, releasing heat energy to the second thermal mass 17 via the second heat exchanger 13, releasing heat energy 20 to heat air in a space via the air heat exchanger 16, releasing heat energy 23 to heat potable water via hot water heat exchanger 22, supplying heat energy to the heat engine 14 to generate mechanical energy 18, or supplying heat energy to the absorption chiller 12 to cool a space. The working fluid 7 in liquid form is collected in the liquid reservoir 15 and pumped back into the solar thermal collector 2 to continue the process. Waste heat energy from the heat engine 14 or absorption chiller 12 can be recovered into the thermal storage tank 6 by redirecting flow of the working fluid 7 into the first heat exchanger 8, thereby transferring the waste heat energy into the first thermal mass 10.

At night, when insufficient solar radiation 5 is present, control points 3 redirect flow of the working fluid 7 such that the second heat exchanger 13 acts as the evaporator. A differential thermostat can be used to detect and initiate this process. Heat energy is collected and stored inside the second thermal mass 17 during the day so that during night time, when there is a need for energy, the second thermal mass 17 releases heat energy into the working fluid 7 via the second heat exchanger 13, causing working fluid 7 to evaporate into a vapor state. The working fluid 7 is then transported to at least one of the following heat usage devices: the first heat exchanger 8, the absorption chiller 12, the heat engine 14, and any combination thereof depending on the end use energy needs. Upon contact with any of the heat usage devices, the working fluid 7 in vapor form condenses into liquid form by either releasing supplying heat energy to the first thermal mass 10 in the outer compartment 21 via the first heat exchanger 16, supplying heat energy to the heat engine 14 to generate mechanical energy 18 and subsequently electricity, or supplying heat energy to the absorption chiller 12 to cool a space with a cooling load. The working fluid 7 in liquid form then flows back into the thermal storage tank 6 to continue the process.

Heating air and potable water does not require an extremely high temperature heat source, therefore, when space heating or hot water is required at night, control points 3 redirect flow of the working fluid 7 such that the first heat exchanger 8 acts as the evaporator. Heat energy is collected during the day and stored inside the first thermal mass 10 so that the first thermal mass 10 releases heat energy into the working fluid 7 via the first heat exchanger 8, causing the working fluid 7 to evaporate into a vapor state. The working fluid 7 is then transported to either the hot water heat exchanger 22 or the air heat exchanger 16 depending on the energy need, wherein upon contact, the vapor state of working fluid 7 condenses into a liquid state by either releasing heat energy 23 to the potable water supplied by a building's water mains via the hot water heat exchanger 22 or releasing heat energy 20 to the air in a space with a heating load via the air heat exchanger 16. The working fluid 7 in liquid form is collected in the liquid reservoir 15 and flows back into the thermal storage tank 6 to continue the process.

It is to be understood that the descriptions are related to a preferred embodiment of the present invention and that many variations, modifications, and other applications of the illustrated embodiment may be made. It will be understood that embodiments, structures, materials, and methods are intended to be typical and representative of rather than in any way limiting on the scope of the present invention. Those skilled in the arts will understand that the invention is capable of variations and modifications without departing from the scope of the appended claims.

We claim:

1. A solar energy system for collecting and distributing heat energy from the sun into a building for usage, comprising:
    closed-loop conduit network circulating a working fluid therein having full contact with the inner surface of the closed-loop conduit network such that the overall temperature of the working fluid constantly equalizes within the closed-loop conduit network, wherein the working fluid is under a predetermined pressure such that phase change occurs whenever heat energy is added or removed,
    an impermeable housing enclosing the closed-loop conduit network and forming an evacuated space located between and defined by the outer surface of the closed-loop conduit network and the inner surface of the impermeable housing such that the working fluid is isolated inside the closed-loop conduit network, and
    a solar thermal collector comprising an enclosure sealing a portion of the evacuated space therein such that the enclosure forms a portion of the impermeable housing, the solar thermal collector further comprising a solar absorber for absorbing solar heat energy and thermally coupled with a heat transfer interface, at which the working fluid received therein evaporates by accepting heat energy from the solar absorber, flows toward and through a heat usage device, at which the working fluid received therein condenses by releasing usable heat; wherein the working fluid has the composition of propylene glycol and phase change of the working fluid minimizes heat energy losses to an outside environment and eliminates any substantial temperature differentials within the closed-loop conduit network.

2. The solar energy system of claim 1, further including a liquid reservoir in series with and adjacent to the outlet of the heat usage device.

3. The solar energy system of claim 1, further including a thermal storage tank containing a thermal mass, wherein the heat usage device is the form of a heat exchanger and located inside the thermal storage tank.

4. The solar energy system of claim 3, wherein the thermal storage tank comprises a second compartment containing a second thermal mass and a second heat exchanger.

5. The solar energy system of claim 1, wherein the heat usage device is in the form of an absorption chiller to provide space cooling.

6. The solar energy system of claim 1, wherein the heat usage device is in the form of an air heat exchanger to provide space heating.

7. The solar energy system of claim 1, wherein the heat usage device is in the form of a water heat exchanger to provide hot water.

8. The solar energy system of claim 1, wherein the heat usage device is in the form of a heat engine configured to produce mechanical work.

9. The solar energy system of claim 8, further including a generator coupled with the heat engine for converting the mechanical work into electrical energy for usage.

10. The solar energy system of claim 1, further including a layer of radiation shielding applied to the inner surface of the impermeable housing.

11. The solar energy system of claim 1, further including a pumping mechanism configured for propelling the working fluid from an outlet of the heat usage device towards an inlet of the heat exchanger.

* * * * *